(12) United States Patent
Hagen et al.

(10) Patent No.: US 7,376,480 B2
(45) Date of Patent: May 20, 2008

(54) MULTIHEAD COMPOSITE MATERIAL APPLICATION MACHINE PROGRAMMING METHOD AND APPARATUS FOR MANUFACTURING COMPOSITE STRUCTURES

(75) Inventors: Allen B. Hagen, Auburn, WA (US); Merrill W. Hogg, Maple Valley, WA (US); Alan K. Jones, Seattle, WA (US); In Kon Kim, deceased, late of Federal Way, WA (US); by Jung Soo Park, legal representative, Federal Way, WA (US); Alan S. Locke, Seattle, WA (US); Paul J. Shirron, Black Diamond, WA (US); Wei-Pai Tang, Redmond, WA (US); Roger L. Williams, Port Orchard, WA (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 11/269,905

(22) Filed: Nov. 9, 2005

(65) Prior Publication Data
US 2007/0106418 A1 May 10, 2007

(51) Int. Cl.
*G06F 19/00* (2006.01)
*B32B 37/00* (2006.01)
*B32B 41/00* (2006.01)

(52) U.S. Cl. .......................... 700/118; 700/98; 156/361

(58) Field of Classification Search .................. 700/98, 700/118, 119; 156/361
See application file for complete search history.

(56) References Cited

U.S. PATENT DOCUMENTS

| | | | | |
|---|---|---|---|---|
| 4,696,707 A | * | 9/1987 | Lewis et al. | 156/64 |
| 4,750,965 A | * | 6/1988 | Pippel et al. | 156/361 |
| 4,867,834 A | | 9/1989 | Alenskis et al. | |
| 5,006,990 A | * | 4/1991 | Ward et al. | 700/97 |
| 5,038,291 A | * | 8/1991 | Wang et al. | 700/98 |
| 5,117,348 A | * | 5/1992 | Romero et al. | 700/57 |
| 6,073,670 A | * | 6/2000 | Koury | 156/425 |
| 6,799,081 B1 | * | 9/2004 | Hale et al. | 700/98 |
| 7,010,472 B1 | * | 3/2006 | Vasey-Glandon et al. | 703/6 |
| 7,137,182 B2 | * | 11/2006 | Nelson | 29/428 |
| 2003/0236588 A1 | * | 12/2003 | Jang et al. | 700/119 |
| 2005/0039842 A1 | * | 2/2005 | Clark et al. | 156/173 |
| 2005/0039843 A1 | * | 2/2005 | Johnson et al. | 156/175 |
| 2005/0247396 A1 | * | 11/2005 | Oldani et al. | 156/173 |

OTHER PUBLICATIONS

Cahuzac, G. "Cost-Effective Multi-Head Fiber Placement Process and Equipment". ECCM-7: Seventh European Conference on Composite Materials (1996): pp. 353-358.*

* cited by examiner

*Primary Examiner*—Ryan A. Jarrett
(74) *Attorney, Agent, or Firm*—Baker & Hostetler LLP (57) ABSTRACT

A composite part program generator includes a computer-aided design (CAD) system interface, a path generator, a course head manager, a post-processor and a machine simulator. The composite part program generator produces composite part programs for use on a multihead composite material application machine, such as a composite tape lamination machine or an automated fiber placement (AFP) machine, to manufacture a complex composite parts, including relatively flat, contoured, or generally cylindrical composite parts. This programming method can reduce the labor and time required to produce a composite part program for a multihead composite material application machine by an order of magnitude with respect to manual or existing automated programming methods.

45 Claims, 5 Drawing Sheets

MULTIHEAD COMPOSITE MATERIAL APPLICATION MACHINE PROGRAMMING METHOD AND APPARATUS FOR MANUFACTURING COMPOSITE STRUCTURES

FIELD OF THE INVENTION

The present invention relates generally to composite part manufacturing. More particularly, the present invention relates to programming multihead, computer-numerical-controlled, composite tape lamination and fiber placement machines.

BACKGROUND OF THE INVENTION

Composite materials have been used increasingly in a variety of industries, including the automotive, marine and aerospace industries. In some instances, composite parts can be formed using automated composite material application machines, such as composite tape lamination machines or composite fiber placement machines.

Some existing composite material application machines, for example, a flat tape lamination machine (FTLM) or a contoured tape lamination machine (CTLM), can be capable of producing flat or gently contoured composite parts by laying relatively wide strips of composite tape onto generally horizontal or vertical tooling surfaces, such as a mandrel. Other existing composite material application machines, for example, an automated fiber placement (AFP) machine, can be capable of producing generally cylindrical or tubular composite parts by wrapping relatively narrow strips of composite tape, or tows, around a rotating manufacturing tool, such as a mandrel.

Generally, existing automated composite material application machines have a single composite material application head. Correspondingly, existing composite material application machine programming systems generally are capable of producing a numerical control (NC) or computer numerical control (CNC) program designed to control a single composite material application machine having a single composite material application head.

In order to more efficiently produce relatively large composite parts, including aircraft fuselage sections, a high-rate, multihead, composite material application machine has been conceived. As conceived, the multihead composite material application machine should be capable of manufacturing a wide variety of composite parts, such as flat spars, stringer charges, wing skins and fuselage barrel sections, as well as composite parts in other industries, such as the automotive, marine, industrial vehicle and prefabricated architectural structure industries.

However, existing composite part programming systems do not have the capacity to efficiently program a composite material application machine with multiple composite material application heads to form a variety of composite parts. Accordingly, it is desirable to provide a method and apparatus that can efficiently produce a composite part program for a high-rate composite material application machine with multiple composite material application heads to form a variety of composite parts without requiring excessive manual programming.

SUMMARY OF THE INVENTION

The foregoing needs are met, to a great extent, by the present invention, wherein in one aspect an apparatus is provided that in some embodiments can efficiently produce a composite part program for a high-rate composite material application machine with multiple composite material application heads to form a variety of composite parts.

In accordance with one aspect of the present invention, a computer-implemented method of programming a multihead composite material application machine can include receiving a composite part definition for a composite part and generating a plurality of paths configured to locate a plurality of segments of a composite material to form the part based on the part definition. The method can also include associating a plurality of associated paths from among the paths to a tool carriage pass and assigning each of the associated paths to one of a plurality of composite material application heads on the multihead composite material application machine.

In accordance with another aspect of the present invention, computer program product for programming a multihead composite material application machine, including a computer-readable medium encoded with instructions configured to be executed by a processor in order to perform predetermined operations, which can include receiving a composite part definition for a composite part and generating a plurality of paths configured to locate a plurality of segments of a composite material to form the part based on the part definition. The predetermined operations can further include associating a plurality of associated paths from among the paths to a tool carriage pass and assigning each of the associated paths to one of a plurality of composite material application heads on the multihead composite material application machine.

In accordance with yet another aspect of the present invention, composite part program generator for programming a multihead composite material application machine can include a computer-aided design interface configured to receive a composite part definition for a composite part and a path generator configured to generate a plurality of paths configured to locate a plurality of segments of a composite material to form the part based on the part definition. The composite part program generator can further include a course head manager configured to associate a plurality of associated paths from among the paths to a tool carriage pass, and assign each of the associated paths to one of a plurality of composite material application heads on the multihead composite material application machine.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment in accordance with the present invention provides a composite part program generator, which can include a computer-aided design (CAD) system interface, a path generator, a course head manager, a post-processor and a machine simulator. The composite part program generator is capable of producing composite part programs for a wide variety of large, complex composite parts, including relatively flat, contoured, or generally cylindrical composite parts. This programming method can reduce the labor required to produce a composite part program for a multihead composite material application machine by an order of magnitude with respect to manual or existing automated programming methods.

The composite part program generator can produce, for example, composite part programs for use with computer-numerical control (CNC) composite material application machines having a single composite material application head, such as existing composite tape-laying machines and automated fiber placement machines. In addition, the composite part program generator can produce composite part programs for use with multihead CNC composite material application machines, as well as multi-machine composite manufacturing equipment.

The CAD interface can receive a composite part design definition from a CAD system and convert the data into a manufacturing tool surface definition and multiple composite ply definitions. The path generator can produce machine-independent composite material application paths based on the manufacturing tool surface definition and multiple composite ply definitions. In addition, the course head manager can assign the machine-independent paths to specific composite material application heads of a specific type of composite material application machine to produce machine-specific paths.

Furthermore, the post-processor can define a manufacturing tool route, compute machine axis positions, and compose a composite part program that can be used to control the composite material application machine and guide the composite material application heads along the paths. Moreover, the machine simulator can simulate the specific type of composite material application machine and associated controllers to verify correct function of the composite part program. Thus, the composite part program generator can assist a programmer in avoiding composite material application head or machine conflicts, such as collisions.

The composite part program generator can facilitate throughput-efficient assignment of composite material application heads or machines to composite material application paths and ply sequences. In addition, the composite part program generator can produce composite part programs to control a higher number of machine axes than that permitted by the maximum interpolation group size of some existing CNC controllers. For example, some existing composite programming methods are limited to one composite material applicator, or delivery head, whereas the method herein disclosed has been demonstrated on four-head and eight-head configurations having up to 50 machine axes on a common, moveable tool carriage and a corresponding rotating manufacturing tool. Furthermore, this method can be scaled for use with machines having at least sixteen delivery heads or systems having at least sixteen single-head machines.

Figure 1:
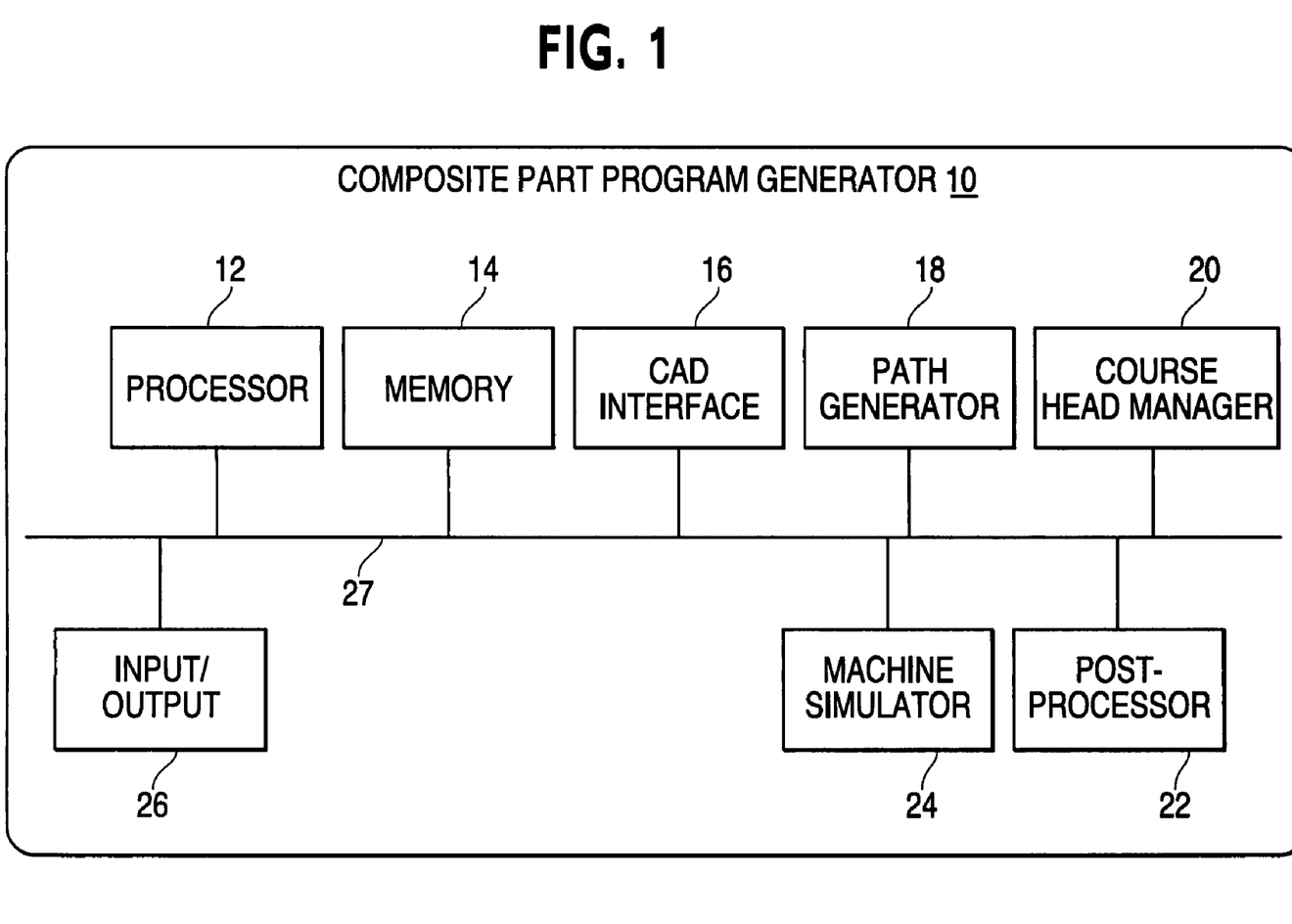
FIG. 1 is a block diagram illustrating a composite part program generator of a type suitable for carrying out the functions of an embodiment of the invention.

The invention will now be described with reference to the drawing figures, in which like reference numerals refer to like parts throughout. An embodiment in accordance with the present invention provides a composite part program generator 10 for producing a composite part program that can control a single-head or multihead CNC composite material application machine. FIG. 1 illustrates an embodiment of a representative embodiment of a composite part program generator 10, including a processor 12, a memory 14, a CAD interface 16, a path generator 18, a course head manager 20, a post-processor 22, a machine simulator 24 and an input/output (I/O) device 26, all of which are interconnected by a data link 27.

The processor 12, the memory 14 and the input/output device 26 can be part of a general computer, such as a personal computer (PC), a UNIX workstation, a server, a mainframe computer, a personal digital assistant (PDA), or some combination of these. The remaining components can include programming code, such as source code, object code or executable code, stored on a computer-readable medium that can be loaded into the memory 14 and processed by the processor 12 in order to perform the desired functions of the composite part program generator 10.

The CAD interface 16 can receive a composite part definition from a CAD system, such as AutoCAD, manufactured by Autodesk, Inc. of San Rafael, Calif.; Pro/Engineer, manufactured by Parametric Technology Corp. of Needham, Mass.; Microstation, manufactured by Bentley Systems of Exton, Pa.; SolidWorks, manufactured by SoliWorks Corp. of Concord, Mass.; or CATIA, manufactured by Dassault Systèmes S.A. of Suresnes, France. The composite part definition can be received in any suitable data file format, including a vector graphics format, such as the .dwg or .dxf file formats (used by AutoCAD) and the .dgn file format (used by Microstation); a boundary representation format, such as the B-REP file format (used by CATIA V4) based on geometric topological boundaries; or a parametric solid/surface feature-based format (used by CATIA V5).

The composite part definition can consist of sequences containing plies. The sequences generally represent layers of a composite material that form the composite part, and plies generally represent a region of a composite material layer. In the CAD data format, for example, each ply can be modeled as a boundary on a complex surface, with associated material and orientation properties.

The CAD interface 16 can convert the received composite part definition data format, which may be unique to the specific CAD system, into a format that is compatible with the path generator 18. For example, the CAD interface 16 can create two data files. The first file can contain the complete surface definition of the composite part, or of a manufacturing tool, such as a mandrel, upon which the composite part is to be formed. This first file can contain data defining each surface region of the composite part, for example, in a B-Spline format. The first file can also define the boundary curves for each surface region. In addition, the first file can contain the various relationships between the boundary curves for each component surface region, describing how the various surface regions fit together.

The second file can contain ply definitions for the various plies that form the composite part. The ply definitions can include, for example, ply boundary data, ply material data and ply orientation data. In addition, each ply can specify a "seed point," that is, a point associated with the ply that defines a location through which the centerline of first composite material segment for that ply must pass.

Based on the composite part surface definition and ply definitions, the composite part program generator 10 can generate paths, which the composite material application heads, can follow to apply the composite material over the manufacturing tool surface, or over a previous ply surface, in order to form the composite part. For example, FIG. 2 illustrates a manufacturing tool 28, or mandrel, for a large, generally cylindrical composite part with eight representative composite material application paths 30 designated in a generally horizontal direction across the surface of the manufacturing tool 28.

Figure 2:
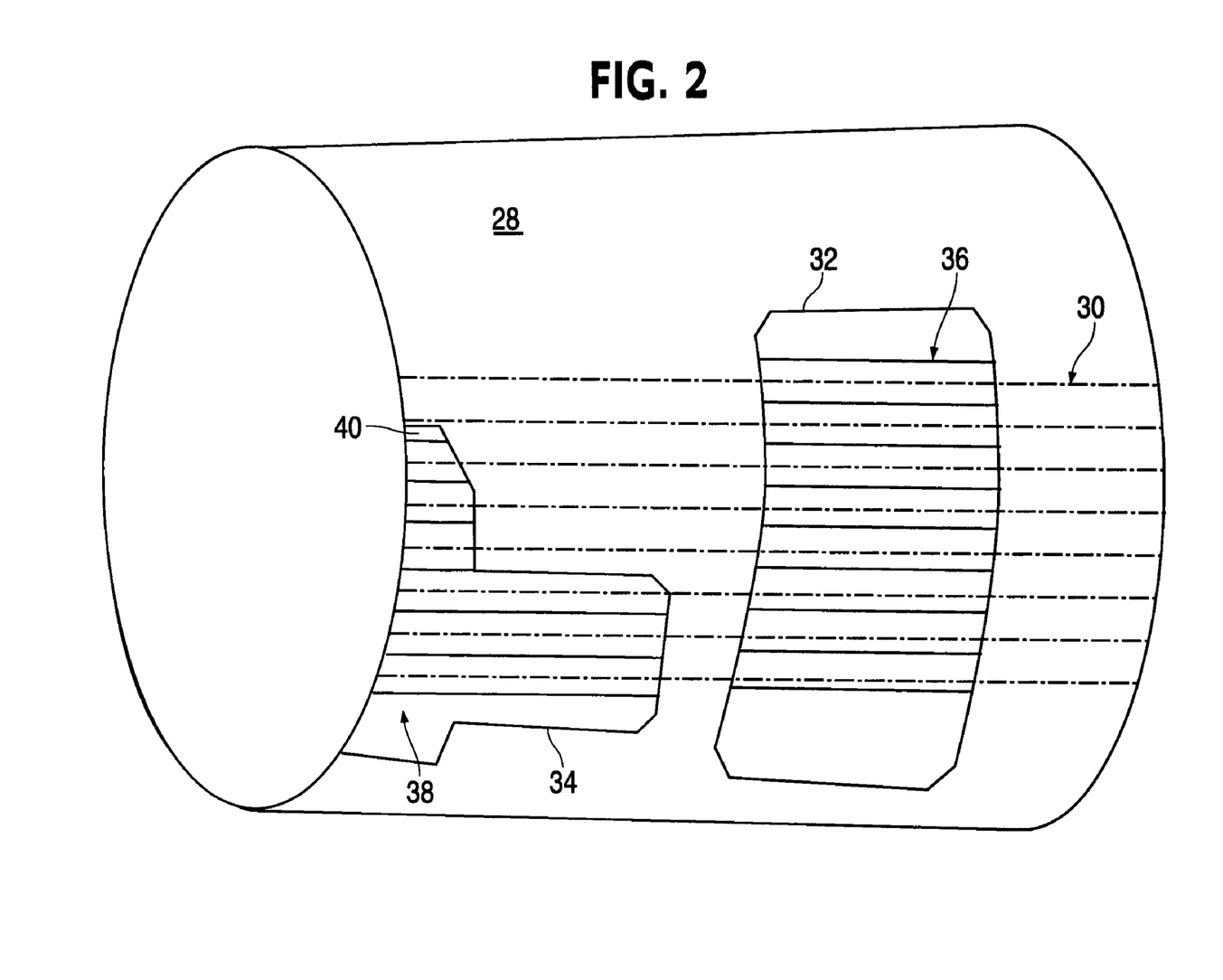
FIG. 2 is a perspective view illustrating a large, generally cylindrical composite part showing designated composite material application paths and tape courses that can be programmed by a preferred embodiment of the invention.

FIG. 2 further illustrates a first ply boundary 32 and a second ply boundary 34. Eight contiguous composite material segments, in this case tape courses 36, which correspond to the composite material application paths 30, are delineated within the first ply boundary 32. Likewise, seven contiguous composite tape courses 38 are delineated within the second ply boundary 34, including a nonstandard tape course 40 having a width that is substantially less than the distance between each of the adjacent pairs of paths 30, or the nominal composite tape width.

As an example, a composite tape-laying machine may have one or more composite material application heads attached to a tool carriage and configured to apply composite tape having a standard or nominal width of three inches, six inches, or any other suitable width. The composite tape-laying machine may further include a composite material application head that applies a strip or multiple strips of composite tape having a nonstandard width. For example, a representative multihead composite tape-laying machine may include one or more standard heads that apply nominal three-inch wide strips of composite tape, as well as one or more specialized heads that apply strips of composite tape of nonstandard width, such as one-eighth inch or one-quarter inch wide strips, or "tows." In addition, a specialized head may have the capacity to apply multiple nonstandard strips up to an aggregate width equal to the nominal tape width, for example, up to twenty-four one-eighth-inch composite tape tows on a machine having a standard nominal tape width of three inches.

Although the composite material application paths 30 and tape courses 36, 38 shown in FIG. 2 are generally horizontal, or parallel to the axis of the manufacturing tool 28 (for reference in this example, the zero-degree fiber orientation), additional plies may have other fiber orientations, such as ninety degrees or forty-five degrees, or any suitable fiber orientation to satisfy the composite part design requirements. In addition, standards are established to set limits on the size of gaps between or overlap of adjacent composite material segments.

Referring again to FIG. 1, the composite material application paths 30 can be defined by the path generator 18. In one embodiment of the composite part program generator 10, the path generator 18 can implement a Cartesian coordinate system, for example, to produce generally flat or contoured parts. In other embodiments, the path generator 18 can implement any suitable coordinate system, for example, a polar coordinate system, such as an angular reference system, for example, to produce generally cylindrical parts on a rotating manufacturing tool 28, a circular coordinate system, a spherical coordinate system; a curvilinear coordinate system; or the like.

The path generator 18 can use the ply boundary definitions created by the CAD interface 16, which describe the areas where composite material is to be applied to form the sequences, or layers, of the composite part, and the manufacturing tool surface definition created by the CAD interface 16, which describes the surface over which the composite part is to be formed, to generate the composite material application paths 30. If the seed point for a ply is not specified in the part definition, the path generator can select a "seed point," for example, the centroid of the ply, as the starting point at which to begin path generation for a given ply.

In various embodiments of the composite part program generator 10, the path generator 18 can analyze the manufacturing tool surface and ply definitions to generate the composite material application paths 30, while ensuring any gaps between or overlap of adjacent paths comply with the gap standard, or specification. The paths can be optimized in accordance with the shape of the overall surface, as well as local regions of the surface. In a preferred embodiment, the path generator 18 can perform a three-dimensional (3-D) analysis to generate the paths 30. However, in an alternative embodiment, the path generator 18 can perform a two-dimensional (2-D) analysis to generate the paths 30. Thus, the path generator 18 can populate the surface area of each ply with paths that are spaced apart by the nominal width of a standard composite material segment, such as a tape course, within a tolerance that complies with the gap or overlap specifications.

The path generator 18 can further define the individual composite material segments. For example, in a preferred embodiment of the invention, the path generator 18 can select an appropriate 2-D reference surface to represent the manufacturing tool surface, or the composite part surface, and initially lay out the composite material segments on the 2-D reference surface. For example, the path generator 18 can select a simplified surface, such as a cylinder, sphere or cone, that can be readily modeled by a mathematical function or a set of mathematic functions, project the manufacturing tool or composite part surface onto the simplified surface, and "unroll" or flatten out the simplified surface to create a planar reference surface upon which to lay out the composite material segments.

In the case of a tape lamination machine, the path generator 18 can define the individual tape courses 36, 38 based on the intersections of the paths 30 with the ply boundaries 32, 34. These intersections can define tape cut patterns required to form the tape courses. In one embodiment of the composite part program generator 10, the tape cut patterns can be defined as butt cuts normal to the centerline of the tape courses 36, 38, while in other embodiments the tape cut patterns can be defined as more complex patterns, for example, consisting of a combination of line segments.

After laying out the composite material segments on the reference surface, the path generator 18 can transform or redefine the composite material segments in terms of the actual 3-D manufacturing tool or composite part surface. This transformation can be accomplished, for example, by applying a reverse function to the 2-D tape course data based on the function, or functions, used to create the reference surface from the actual manufacturing tool 28 or composite part surface. In addition, for each sequence of plies, the path generator 18 can update the surface definition to add the thickness of the composite material over each ply area of the sequence.

The paths 30 defined by the path generator 18 can be independent of any composite material application machine. Subsequently, the machine-independent paths 30 can be assigned to specific delivery heads of a specific type of composite material application machine by the course head manager 20 to generate machine-specific paths.

The course head manager 20 can receive the relatively complex three-dimensional (3-D) geometry of the composite material application paths 30 defined by the path generator 18 and check the paths 30 for errors, such as redundant points or the like. If errors are identified, the course head manager 20 can correct the errors, for example, removing redundant points. In addition, the course head manager 20 can analyze the 3-D geometry of each of the paths 30 to determine which, if any, of the paths 30 need to be assigned to specialized delivery heads.

In addition, the course head manager 20 can perform a machine-specific optimization algorithm to determine the most efficient composite material application head-to-path assignments, that is, the assignments that will result in the shortest production time required to manufacture the composite part. For example, the course head manager 20 can assign the paths to specific composite material application heads and specific passes of the tool carriage in one of two ways.

First, for machines with all standard heads, the course head manager 20 can arrange the heads in a fixed constellation configuration on the tool carriage, which can be moved over the surface. In this case, distinct constellation designs are required for each combination of ply orientation and tool-carriage direction of travel along the paths 30. In addition, each head can be allowed to move relative to the constellation within a limited range to track the precise 3-D geometry of the corresponding path 30 over the surface. Furthermore, limitations or tolerances on movement of the individual composite material application heads within the constellation can prevent collisions between the composite material application heads, or between the composite material application heads and other machine structure.

Second, for machines having one or more specialized composite material application heads, the course head manager 20 can use "greedy optimization" to efficiently assign the paths 30 to the composite material application heads. That is, for each pass of the tool carriage, a maximum possible number of paths 30 is assigned to that pass, subject to two conditions: first, if possible, each special head can be assigned a path 30 requiring that head; second, whenever possible, a group of contiguous paths 30 are assigned to all composite material application heads, so as to not leave unassigned paths. In some cases, the unavailability of sufficient specialized heads can require that a path 30 requiring a specialized head remain unassigned between assigned paths. However, when possible, this is avoided because of the difficulty of efficiently filling in a skipped path on a later pass.

In some embodiments of the composite part program generator 10, the course head manager 20 can construct a 2-D representation based on the 3-D geometry of the paths 30 to create an ordered set of logical paths, and perform the head-to-path assignment analysis in the 2-D realm. In these embodiments, the course head manager 20 can later associate the 3-D paths with the respective 2-D composite material application head and tool carriage pass assignments. In other embodiments, the course head manager 20 can perform the head-to-path assignment analysis in the 3-D realm. Furthermore, the course head manager 20 can perform various cleanup tasks to organize the resulting data.

The resulting path and head assignment data can be used by the post-processor 22 to generate CNC part programs in machine code format that can be executed on a multihead composite material application machine, as well as on a conventional single-head composite material application machine. The post-processor 22 can provide the capability in post-processing for the programmer to manage composite material application head dynamics, such as approaching or departing the manufacturing tool or composite part surface, and starting, stopping and cutting the composite material. The post-processor 22 also allows the programmer to control machine axis accelerations and velocities, so as to improve or optimize an overall composite material application rate.

Initially, the post-processor 22 can receive the path data, including the path definitions as well as the path-to-head and carriage pass assignments. The post-processor 22 can add machine axis motion control data for approach of the composite material application heads to the manufacturing tool or composite part surface at the beginning of each tool carriage pass or composite material segment and departure of the composite material application heads from the surface at the end of each pass or segment. That is, for each composite material application head having a path assigned on a given tool carriage pass, the post-processor 22 can add an approach-to-surface definition, or motion profile, and a departure-from-surface definition, or motion profile. In some embodiments of the composite part program generator 10, the post-processor 22 can add a head approach profile and departure profile for each composite material application path 30. In other embodiments, the post-processor 22 can add a head approach profile and departure profile for each composite material segment along each of the paths 30.

Thus, for each composite material application path 30, or for each composite material segment along each path 30, the post-processor 22 can add machine axis motion control data for accelerating the corresponding head in advance, then momentarily decelerating the head, cutting a composite material end, starting a composite material feed, and accelerating the head to reposition the head in a nominal position relative to the tool carriage or constellation and match the tool carriage speed. This process, referred to as "add on the fly," can be synchronized so that the composite material end is placed in a precise location. For example, on a tape-laying machine, the "add on the fly" process can be synchronized such that the tape end passes under a corresponding head compaction device precisely at the location specified by the composite material segment definition, that is, in compliance with a specified composite material end placement tolerance.

Similarly, for each composite material application path 30, or for each composite material segment along each path 30, the post-processor 22 can add machine axis motion control data for accelerating the corresponding head in advance, then decelerating the head to momentarily match the velocity of the manufacturing tool surface, cutting a composite material end, stopping the composite material feed, and accelerating the head to reposition the head in a nominal position relative to the tool carriage or constellation. This process, referred to as "cut on the fly," can also be synchronized so that the composite material end is placed in a precise location. For example, on a tape-laying machine, the "cut on the fly" process can be synchronized such that the tape end passes under the corresponding head compaction device precisely at the location specified by the composite material segment definition, that is, in compliance with a specified composite material end placement tolerance. Furthermore, the "cut on the fly" process can include decelerating the head to momentarily maintain a fixed position with regard to the manufacturing tool or composite part surface to allow time for the composite material to be cut in place.

The "add on the fly" and "cut on the fly" motion profiles, as well as the approach-to-surface and departure-from-surface motion profiles, can be dynamic—that is, the motion profiles can vary depending on the length of the individual composite material segments and the respective distances between the composite material segments. Therefore, the post-processor 22 can further verify that the composite material application head approach and departure motion profiles, as well as the "add on the fly" and "cut on the fly" motion profiles, at all points define a continuous and smooth head motion, with regard to the absolute position of the corresponding composite material application head as well as the relative position of the head with respect to the tool carriage position. In addition, the post-processor 22 can verify that the approach, departure, "add on the fly" and "cut on the fly" motion profiles do not violate any requirements or specifications regarding the composite material application machine dynamics.

In some embodiments of the composite part program generator 10, the post-processor 22 can include in the approach-to-surface definition a specified location where a composite material applicator compaction device is to be activated, or "compaction on" location. Likewise, the post-processor 22 can include in the departure-from-surface definition a specified location where the composite material applicator compaction device is to be deactivated, or "compaction off" location. In other embodiments, the post-processor 22 can specify a "compaction on" location and a "compaction off" location for each composite material segment along each of the paths 30, for example, in the case of a composite tape-laying machine, for each tape course along each path 30.

Furthermore, the post-processor 22 can define a constellation pathway, or a sequence of constellation pathways. That is, the post-processor 22 can evaluate a group of material application paths 30 assigned to a single tool carriage pass and determine a median pathway relative to the group of paths 30. For example, the post-processor 22 can determine an ideal constellation pathway with regard to each composite material application head that has an assigned path for the tool carriage pass, and based on the set of ideal paths determine a median constellation pathway. The post-processor can further verify that each of the heads is able to reach all points of the corresponding path locations based on the constellation pathway.

Additionally, the post-processor 22 can extend the median pathway and define constellation start and end points for the pass—that is, the post-processor 22 can specify a location at which the composite material application heads can be set or positioned in a specific constellation configuration, and a location at which the composite material application heads can be reset or repositioned in a different constellation configuration. The post-processor 22 can further connect the sequential constellation pathways into a continuous chain of directional pathways, or a single continuous pathway.

Moreover, based on the paths 30 and the corresponding constellation pathway, the post-processor 22 can define a relative path for each composite material application head that has an assigned path. The relative paths relate the individual paths 30 to the constellation pathway. Accordingly, the post-processor can determine machine axis solutions to control the individual head movements with respect to the tool carriage based on the relative paths. For example, the post-processor 22 can implement classic machine kinematics logic to generate machine axis position solutions based on the constellation pathway points, the individual path points and the manufacturing tool surface or updated surface normal data. The machine axis solutions can be used to control the composite material application machine movements by way of servo motors, or any suitable actuator for producing composite material application head, tool carriage or manufacturing tool motion.

Since there is always at least one common machine axis direction of motion shared between all the composite material application heads, all head machine axes are interpolated as a group. However, existing CNC controllers do not have the capacity to interpolate a relatively large number of axes in a single interpolation group. Thus, in order to overcome existing CNC controller limitations on axis count, the post-processor 22, rather than the CNC controller, can calculate individual machine axis position, velocity, acceleration, and jerk or surge at all points. The post-processor 22 can further verify that the machine axis solutions do not violate the limitations or specifications of the machine and make minor adjustments to the machine axis solutions to produce smooth physical transitions, while maintaining accurate composite material application paths. Thus, the post-processor can closely synchronize the composite material application head machine axis solutions.

Based on the constellation pathway, the post-processor 22 can define a tool carriage route and a manufacturing tool, or mandrel, route. For example, the post-processor 22 can determine a sequence of directional passes of the tool carriage across the surface of the manufacturing tool or composite part, and a sequence of rotational or angular movements for a rotating mandrel or translational movements for a flat or contoured mandrel. Since the movement of the composite material application heads over the manufacturing tool or composite part surface depend on the relational position of the tool carriage with respect to the manufacturing tool, some movements of the composite material application heads over the manufacturing tool or composite part surface can be determined by changes in the tool carriage position, the manufacturing tool position, or both. Thus, the manufacturing tool route and the tool carriage route can be interdependent.

Accordingly, the post-processor 22 can synchronize the manufacturing tool route with the tool carriage route to determine an efficient or optimal combination of manufacturing tool and tool carriage movements to obtain the required relational positions based on the constellation pathway. That is, the post-processor 22 can implement classic machine kinematics logic to simultaneously generate machine axis solutions for the tool carriage and for the manufacturing tool in order to effect the constellation pathway. In addition, the post-processor 22 can closely synchronize the individual head machine axis solutions with the tool carriage and manufacturing tool machine axis solutions in order to maintain accurate composite material application head control.

In a preferred embodiment of the composite part program generator 10, a master-slave axis relationship across multiple distributed CNC controllers can be accommodated to manage the relatively large number of coordinated machine axes. For example, the multihead composite material application machine can be controlled by a master CNC controller and multiple slave CNC controllers. The master controller and the slave controllers can be networked together over a high-speed bus that can facilitate the exchange of relevant data between the various controllers during each interpolation cycle. Thus, the master controller can coordinate the individual CNC interpolation cycles.

For example, each of the CNC controllers can be configured with three process channels, each of which can have a permanent part program that executes cyclically during composite material application activities. The permanent part programs can be used, for example, to coordinate individual head motion when the head is not adjacent the manufacturing tool or composite part surface. In addition, the permanent part programs can be used to coordinate incremental background loading of curve table data into the individual controller memory and control the sequence of curve table engagement to the servo axes and auxiliary code data streams.

Furthermore, in order to increase the overall composite material application rate, the post-processor 22 can set a constellation rate, or the rate of motion of a master axis—which can correspond, for example, to the tool carriage motion, to the manufacturing tool motion, or to a combination of the tool carriage motion and the manufacturing tool motion—to one of several predetermined rates that correspond to various composite material application machine operations for each tool carriage pass. For example, in a preferred embodiment, the constellation rate can be adjusted to one of three basic rates, which correspond to composite material "add," "lay down," and "cut" machine operations. Generally, the constellation rate can be constrained by the worst case dynamics of any active composite material application head at any point in time of a tool carriage pass, allowing for acceleration and deceleration time.

In addition, the post-processor 22 can check machine axis limits for all composite material application head, tool carriage and manufacturing tool machine axes to verify that the machine axis limits are not exceeded at any time. Moreover, the post-processor 22 can check all composite material application head positions to ensure that the composite material application head paths of motion are collision-free. In addition, the post-processor 22 can calculate and report the total composite material usage for the composite part program.

Finally, the post-processor 22 can create an output file, or a set of output files, containing the results of the machine axis solutions in a data format that is compatible with the CNC controller used in conjunction with the specific composite material application machine. For example, in a preferred embodiment of the composite part program generator 10, the output file can be written in a unique curve table format that is compatible with the Siemens 840D CNC controller family. In some embodiments, an output file or a set of output files can be created for each tool carriage pass defined by the composite part program.

For example, for each tool-carriage pass, the post-processor 22 can produce a curve table file for each machine axis to provide positional data, such as linear interpolation coordinate-point pairs or polynomial function definitions, including the necessary master-slave relationships. Moreover, for each tool carriage pass, the post-processor 22 can produce an additional curve table file for each composite material application head to provide auxiliary code definitions, such as composite material feed control data, cutter control data, and so on. Thus, the post-processor 22 can create multiple, concurrent composite part programs for use with a CNC controller and a composite material application machine, such as a composite tape lamination machine or an automated fiber placement (AFP) machine to manufacture a composite part.

In some embodiments, the output file data format can be compatible with a master-slave CNC control scheme, such as that disclosed herein. For example, in a preferred embodiment, the Siemens 840D curve table format can implement the master-slave axis relationships of the multihead composite material application machine. This is made possible because the curve table can provide a mathematical definition between a leading variable and a slave variable that can be applied to both pairs of machine axes, in addition to conventional CNC control variables applied to each machine axis.

In a preferred embodiment of the invention, the post-processor 22 can create a supplemental output file, or a set of supplemental output files, in a data format that is compatible with the machine simulator 24. For example, the post-processor 22 can produce an output file containing a time-based sampling of the machine axis positional data for use by the machine simulator 24, which may not be capable of interpreting the composite part program, for example, in the Siemens 840D curve table format.

The machine simulator 24 can receive the output file or the supplemental output file and simulate the composite material application machine operations, including multiple composite material application heads with multiple machine axes. For example, the machine simulator 24 can model the physical machine, replicate the CNC controller functions, and produce cycle information in order to facilitate machine collision avoidance and process refinement. Thus, the machine simulator 24 can eliminate waste and increase the economic value of the CNC manufacturing process.

During the development of a composite part program, prior to running the program on an actual composite material application machine, the composite part program, or the supplemental equivalent, can be simulated by the machine simulator 24 to verify that the composite part program does not contain errors, in particular, positional errors that potentially could damage the machine, such as collisions between the composite material application heads or between an individual composite material application head and other machine structures.

The machine simulator 24 can provide user feedback, for example, by way of a graphic display or via caution messages. The machine simulator 24 can function as an interactive, 3-D simulation environment. Thus, the machine simulator 24 can provide for visualization and analysis of the functionality—for example, a composite material application or removal process—of the physical machine, including a CNC controller. The machine simulator 24 can enable the user to improve the quality or efficiency of the composite part program, eliminate catastrophic program errors, and optimize machining processes.

For example, in a preferred embodiment of the invention, the machine simulator 24 can be based on the DELMIA VNC simulation system, manufactured by Dassault Systèmes S.A. of Suresnes, France. However, an existing version of DELMIA VNC is limited to simulating eighteen or fewer axes of machine motion in a synchronized simulation mode. In order to support simulation of a larger number of axes, each composite material application head can be defined as a separate, or independent, device having five axes. The individual composite material application heads can be synchronized in the simulation by simulating digital communication (I/O) signals between the devices. This simulation process can enable the synchronized simulation of a larger number of axes; for example, a machine with forty-two axes has been simulated in synchronized mode using this process.

Figure 3:
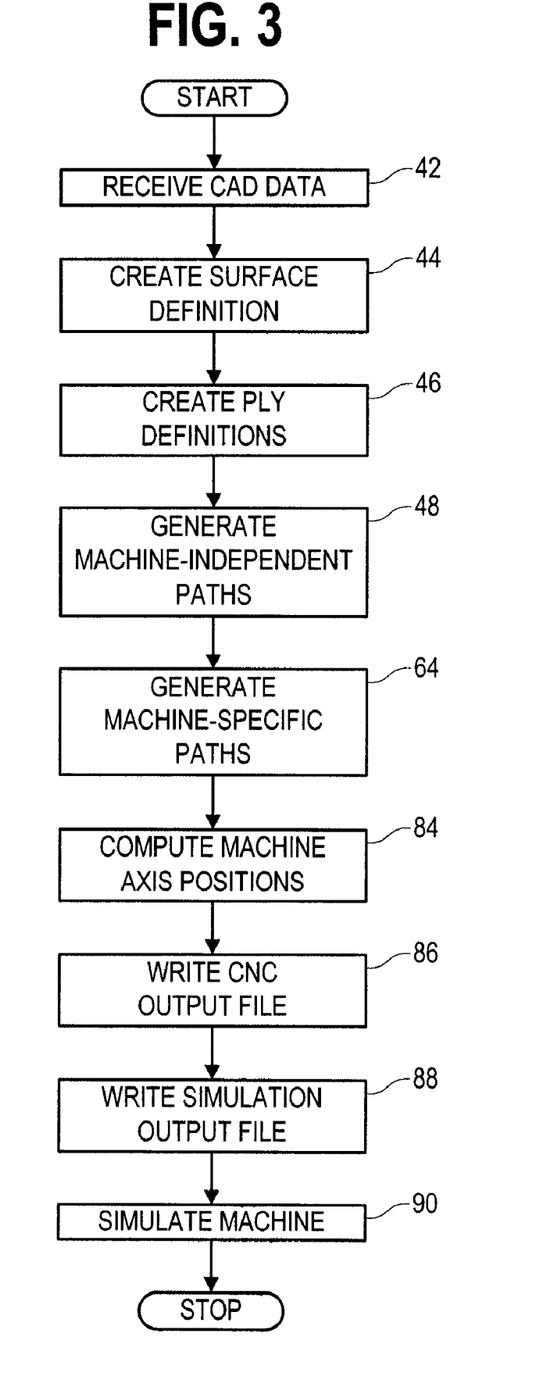
FIG. 3 is a flowchart illustrating steps that may be followed to generate a composite part program in accordance with one embodiment of the method or process.

FIG. 3 is a flowchart illustrating a sequence of steps that can be performed in order to generate a composite part program. The process can begin by proceeding to step number 42, "Receive CAD Data," in which a composite part program generator can receive a composite part definition from a CAD system and convert the received composite part definition data format, which may be unique to the specific CAD system, into a format that is compatible with a path generator. For example, as explained above, in step 44, "Create Surface Definition," the composite part program generator can create a first data file containing the complete surface definition of a manufacturing tool or of a composite part, and in step 46, "Create Ply Definitions," the composite part program generator can create a second data file containing ply definitions for the various plies that form the composite part.

The process can then continue to step 48, "Generate Machine-Independent Paths," where the composite part program generator can define paths, as described above, which the composite material application heads associated with a composite material application machine can follow to apply a composite material over the manufacturing tool surface, or over a previous ply surface, in order to form the composite part. As further described above, the composite part program generator can use the manufacturing tool surface and ply boundary definitions created in steps 44 and 46 to generate the paths. In addition, as explained above, in the case of a tape-laying machine, individual tape courses can be defined based on the intersections of the paths with the ply boundaries.

Figure 4:
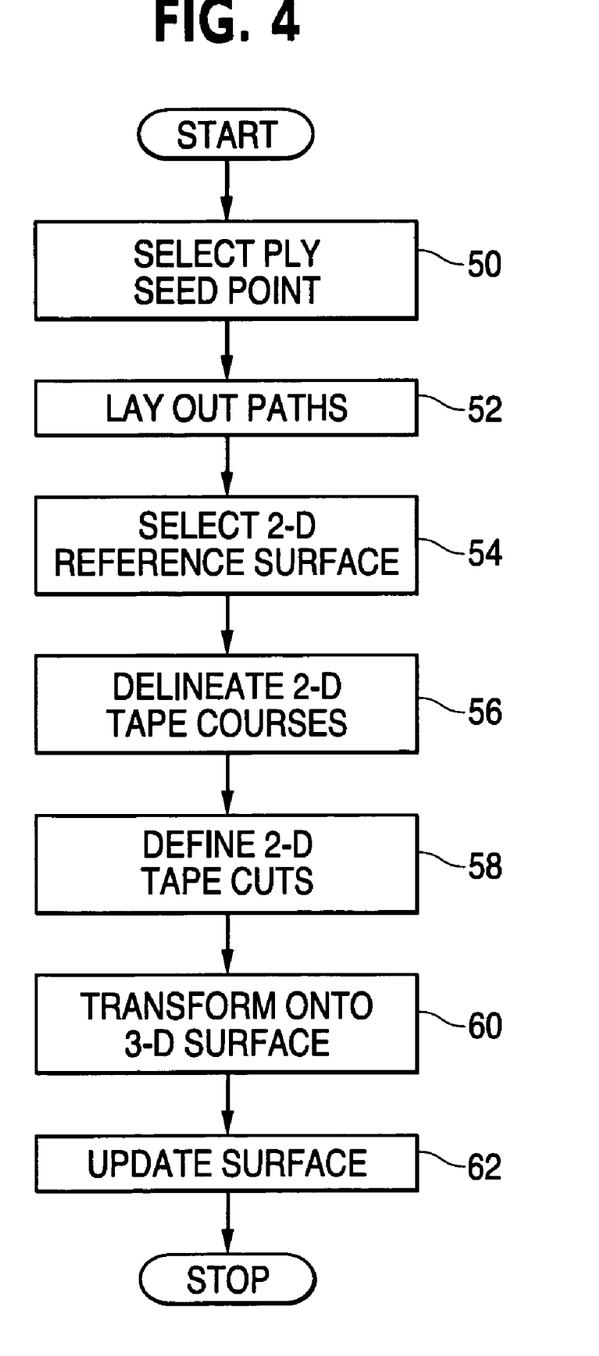
FIG. 4 is a flowchart illustrating steps that may be followed to generate machine-independent paths in the method FIG. 3.

FIG. 4 is a flowchart illustrating a sequence of detail steps that can be performed in order to generate machine-independent paths in step 48. Based on the manufacturing tool surface definition, in step 50, "Select Ply Seed Point," the composite part program generator can select an appropriate starting point within a ply boundary on the 2-D surface at which to begin path generation for a given ply. This selection can be performed for each defined ply of a sequence.

Next, in step 52, "Lay Out Paths," based on the surface definition and ply definitions, the composite part program generator can lay out parallel paths on the reference surface to cover the entire surface based on a nominal width of the composite material, taking into account any desired gap between the pieces of material. As explained above, the composite part program generator can analyze the manufacturing tool surface and ply definitions to generate the composite material application paths, while ensuring any gaps between or overlap of adjacent paths comply with the gap standard, or specification. The paths can further be optimized in accordance with the surface shape.

Then, in step 54, "Select 2-D Reference Surface," the composite part program generator can determine an appropriate two-dimensional reference surface to represent the manufacturing tool surface or the composite part surface. For example, the composite part program generator can select a simplified surface that can be readily modeled by a mathematical function or a set of mathematic functions to represent the more complex manufacturing tool of composite part surface. In this case, the manufacturing tool or composite part surface can be projected onto the simplified surface, and the simplified surface can be "unrolled" or flattened out to create a representative 2-D surface upon which to initially lay out the paths.

In the case of a composite tape lamination machine program, based on the intersections between the ply boundaries and the paths, in step 56, "Delineate 2-D Tape Courses," the composite part program generator can delineate two-dimensional tape courses corresponding to each path within the boundaries of each ply of the sequence. In step 58, "Define 2-D Tape Cuts," the composite part program generator can further delimit the precise tape cut patterns required to form the individual tape courses based on the intersections of the ply boundaries and the paths.

After laying out the 2-D courses, in step 60, "Transform onto 3-D Surface," the composite part program generator can redefine the paths in terms of the actual 3-D manufacturing tool or composite part surface. As explained above, this transformation can be accomplished, for example, by applying a reverse function to the 2-D data based on the function used to create the reference surface. Finally, in step 62, "Update Surface," the composite part program generator can update the surface definition to add the thickness of the composite material added to each ply area of the sequence, so that the 3-D paths and tape courses defined for the subsequent sequence can be located over the surface of the current sequence.

Referring again to FIG. 3, after the machine-independent paths have been generated in step 48, control can pass to step 64, "Generate Machine-Specific Paths," in which the composite part program generator can assign the machine-independent paths to specific delivery heads associated with specific tool carriage passes of a specific type of composite material application machine to generate machine-specific paths. As described above, the composite part program generator can perform machine-specific optimization to determine the most efficient composite material application head-to-path assignments.

Figure 5:
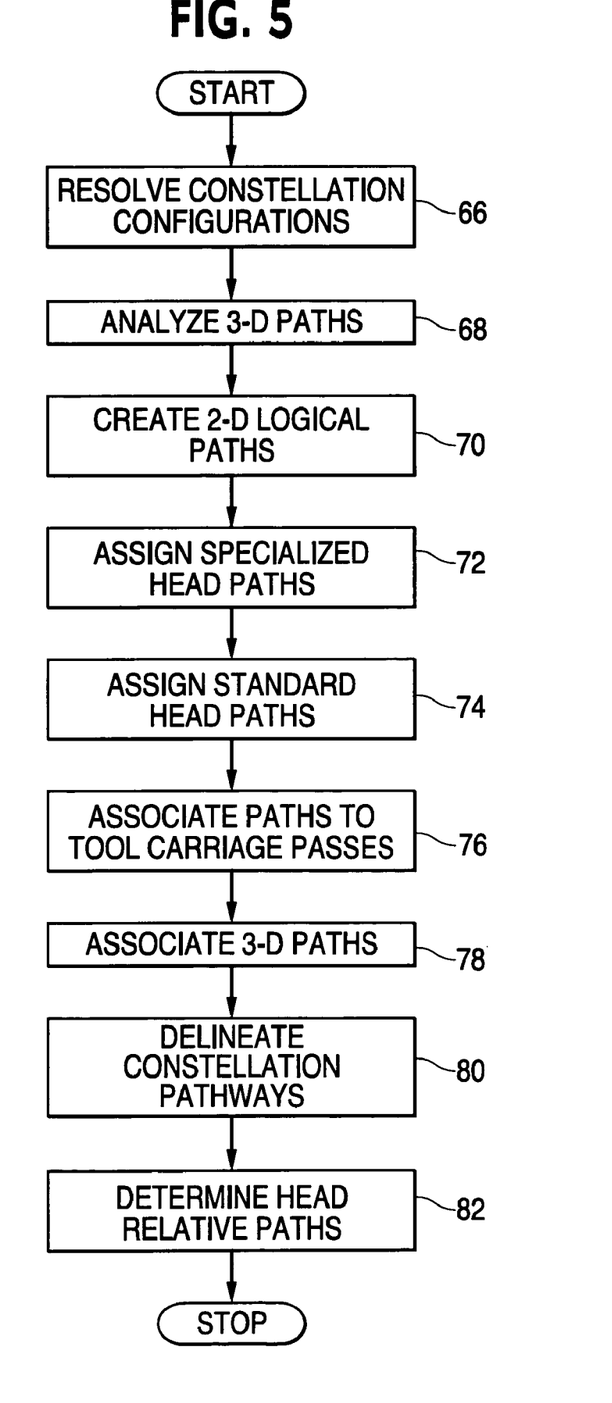
FIG. 5 is a flowchart illustrating steps that may be followed to generate machine-specific paths in the method of FIG. 3.

FIG. 5 is a flowchart illustrating a sequence of detail steps that can be performed in order to generate machine-specific paths in step 64. Based on the defined ply orientations and the directions of travel of the tool carriage relative to the manufacturing tool surface (in each of two directions along the corresponding paths), in step 66, "Resolve Constellation Configurations," the composite part program generator can define composite material application head constellation configurations corresponding to each combination of ply orientation, or fiber orientation, and tool carriage direction of travel.

Then, in step 68, "Analyze 3-D Paths," the composite part program generator can analyze the 3-D geometry of each of the machine-independent paths to determine which, if any, of the paths require a special function of a specialized delivery head. Next, as further explained above, in step 70, "Create 2-D Logical Paths," the composite part program generator can construct a 2-D representation based on the 3-D geometry of the paths to create an ordered set of logical paths with equal spacing.

Subsequently, in step 72, "Assign Specialized Head Paths," the composite part program generator can perform machine-specific optimization to determine the most efficient composite material application head-to-path assignments, and assign the paths that require special composite material application head functions to specific specialized heads of specific passes of the tool carriage. As described above, the composite part program generator can apply "greedy optimization" to determine the most efficient assignment of the specialized heads.

Then, in step 74, "Assign Standard Head Paths," the composite part program generator can perform further machine-specific optimization and assign paths to the standard composite material application heads. Next, in step 76, "Associate Paths to Tool Carriage Passes," the composite part program generator can assign, or associate, each of the paths to a specific tool carriage pass over the manufacturing tool surface. In some embodiments, steps 72, 74 and 76 can be synchronized, for example, by an iterative repetition of the individual steps, to produce the most efficient overall assignment of composite material application heads. After determining the head-to-path assignments, in step 78, "Associate 3-D Paths," the composite part program generator can associate the 3-D paths with the respective 2-D composite material application head and tool carriage pass assignments.

Subsequently, in step 80, "Delineate Constellation pathways," the composite part program generator can delineate a constellation pathway. For example, as explained above, the composite part program generator can determine an ideal constellation pathway with regard to each composite material application head that has an assigned path for the tool carriage pass, and based on the set of ideal paths determine a median constellation pathway, and connect the resulting constellation pathways into a continuous chain of directional pathway, or a single continuous pathway. Then, in step 82, "Determine Head Relative Paths," the composite part program generator can define a relative path for each composite material application head relating the individual paths to the constellation pathway.

Referring again to FIG. 3, control passes to step 84, "Compute Machine Axis Positions," in which the composite part program generator can determine machine axis solutions to control the individual head movements with respect to the tool carriage based on the relative paths, to control the tool carriage movements, and to control the manufacturing tool movements. For example, as described above, the composite part program generator can implement classic machine kinematics logic to generate composite material application head machine axis position solutions based on the constellation pathway points, the individual path points and the manufacturing tool surface or updated surface normal data. Thus, as explained above, the machine axis solutions for the composite material application head, the tool carriage and the manufacturing tool can be closely synchronized. In addition, the composite part program generator can verify that the machine axis limits are not exceeded at any time, and check all composite material application head positions to ensure that the head paths of motion are collision-free.

Next, in step 86, "Write CNC Output File," as explained above, the composite part program generator can create a composite part program comprised of a set of output files containing the results of the machine axis solutions in a data format that is compatible with the CNC controller used in conjunction with the specific composite material application machine, for example, in the Siemens 840D curve table format. Next, in step 88, "Write Simulation Output File," the composite part program generator can optionally create a set of supplemental output files containing a time-based sampling of the machine axis positional data in a simulation data format.

Later, in step 90, "Simulate Machine," the composite part program generator can simulate the composite material application machine operations, including multiple composite material application heads with multiple machine axes. For example, as described above, the composite part program generator can model the physical machine, replicate the CNC controller functions, and produce cycle information in order to facilitate machine collision avoidance and process refinement.

FIGS. 1, 3, 4 and 5 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the apparatus of one embodiment including several of the key components of a general purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general purpose computer can include a processing unit 12 and a system memory 14, which may include random access memory (RAM) and read-only memory (ROM). The computer also may include nonvolatile storage memory, such as a hard disk drive, where additional data can be stored.

An embodiment of the present invention can also include one or more input or output devices 28, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection. In one embodiment of the present invention, the document collection includes documents received over the Internet. Other embodiments are possible, including: a local document collection, i.e., all documents on one computer, documents stored on a server or a client in a network environment, etc.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of programming a multihead composite material application machine, comprising:
   receiving a composite part definition for a composite part;
   selecting a reference coordinate system based on the part definition and generating a plurality of paths configured to locate a plurality of segments of a composite material to form the part;
   associating a plurality of associated paths from among the paths to a tool carriage pass; and
   assigning each of the associated paths to one of a plurality of composite material application heads on the multihead composite material application machine.

2. The computer-implemented method of claim 1, further comprising converting the part definition from a computer-aided design format to a manufacturing tool surface definition and a plurality of ply definitions, wherein the part definition is received in the computer-aided design format.

3. The computer-implemented method of claim 2, further comprising delimiting a composite tape course definition based on the manufacturing tool surface definition, one of the ply definitions and one of the paths.

4. The computer-implemented method of claim 1, further comprising:
   analyzing each of the paths to determine if any of the paths requires a specialized composite material application head; and
   assigning any of the paths that requires the specialized composite material application head to a corresponding specialized composite material application head on the multihead composite material application machine.
   assigning any of the paths that requires the specialized composite material application head to a corresponding specialized composite material application head on the multihead composite material application machine.

5. The computer-implemented method of claim 1, further comprising performing machine-specific optimization to determine the most efficient associations and assignments of the paths.

6. The computer-implemented method of claim 1, further comprising resolving a composite material application head constellation configuration based on a ply orientation and a tool carriage direction of travel.

7. The computer-implemented method of claim 6, further comprising defining a constellation pathway based on the constellation configuration and the associated paths.

8. The computer-implemented method of claim 7, further comprising:
   delineating a tool carriage route based on the constellation pathway; and
   delineating a manufacturing tool route based the constellation pathway, wherein the tool carriage route and the manufacturing tool route are interdependent.

9. The computer-implemented method of claim 1, further comprising computing a plurality of machine axis position solutions to control at least one selected from the following: the tool carriage, the manufacturing tool and the composite material application heads; wherein the machine axis position solutions are based at least in part on one selected from the following: the tool carriage route, the manufacturing tool route, the constellation configuration, the paths, the association of the paths, and the assignment of the paths.

10. The computer-implemented method of claim 9, further comprising writing a computer numerical control output data file based on the machine axis position solutions.

11. The computer-implemented method of claim 9, further comprising writing an output data file based on the machine axis position solutions, wherein the output data file is compatible with a simulator.

12. The computer-implemented method of claim 1, further comprising simulating the multihead composite material application machine, a machine controller, and a manufacturing tool to verify collision avoidance and to facilitate manual process refinement.

13. The computer-implemented method of claim 1, wherein the multihead composite material application machine comprises a plurality of composite tape laying heads.

14. The computer-implemented method of claim 1, wherein the multihead composite material application machine comprises a plurality of composite fiber placement heads.

15. The computer-implemented method of claim 1, further comprising adjusting a motion profile of one of the application heads in response to dynamically occurring data.

16. A computer program product for programming a multihead composite material application machine, including a computer-readable medium encoded with instructions configured to be executed by a processor in order to perform predetermined operations comprising:
receiving a composite part definition for a composite part;
selecting a reference coordinate system based on the part definition and generating a plurality of paths configured to locate a plurality of segments of a composite material to form the part;
associating a plurality of associated paths from among the paths to a tool carriage pass; and
assigning each of the associated paths to one of a plurality of composite material application heads on the multihead composite material application machine.

17. The computer program product of claim 16, wherein the predetermined operations further comprise converting the part definition from a computer-aided design format to a manufacturing tool surface definition and a plurality of ply definitions, wherein the part definition is received in the computer-aided design format.

18. The computer program product of claim 17, wherein the predetermined operations further comprise delimiting a composite tape course definition based on the manufacturing tool surface definition, one of the ply definitions and one of the paths.

19. The computer program product of claim 16, wherein the predetermined operations further comprise:
analyzing each of the paths to determine if any of the paths requires a specialized composite material application head; and
assigning any of the paths that requires the specialized composite material application head to a corresponding specialized composite material application head on the multihead composite material application machine.

20. The computer program product of claim 16, wherein the predetermined operations further comprise performing machine-specific optimization to determine the most efficient associations and assignments of the paths.

21. The computer program product of claim 16, wherein the predetermined operations further comprise resolving a composite material application head constellation configuration based on a ply orientation and a tool carriage direction of travel.

22. The computer program product of claim 21, wherein the predetermined operations further comprise defining a constellation pathway based on the constellation configuration and the associated paths.

23. The computer program product of claim 22, wherein the predetermined operations further comprise:
delineating a tool carriage route based on the constellation pathway; and
delineating a manufacturing tool route based the constellation pathway, wherein the tool carriage route and the manufacturing tool route are interdependent.

24. The computer program product of claim 16, wherein the predetermined operations further comprise computing a plurality of machine axis position solutions to control at least one selected from the following: the tool carriage, the manufacturing tool and the composite material application heads; wherein the machine axis position solutions are based at least in part on one selected from the following: the tool carriage route, the manufacturing tool route, the constellation configuration, the paths, the association of the paths, and the assignment of the paths.

25. The computer program product of claim 24, wherein the predetermined operations further comprise writing a computer numerical control output data file based on the machine axis position solutions.

26. The computer program product of claim 24, wherein the predetermined operations further comprise writing an output data file based on the machine axis position solutions, wherein the output data file is compatible with a simulator.

27. The computer program product of claim 16, wherein the predetermined operations further comprise simulating the multihead composite material application machine, a machine controller, and a manufacturing tool to verify collision avoidance and to facilitate manual process refinement.

28. The computer program product of claim 16, wherein the multihead composite material application machine comprises a plurality of composite tape laying heads.

29. The computer program product of claim 16, wherein the multihead composite material application machine comprises a plurality of composite fiber placement heads.

30. The computer program product of claim 16, wherein the predetermined operations further comprise adjusting a motion profile of one of the application heads in response to dynamically occurring data.

31. A composite part program generator stored on a computer readable medium for programming a multihead composite material application machine, comprising:
a computer-aided design interface configured to receive a composite part definition for a composite part;
a path generator configured to select a reference coordinate system based on the part definition to generate a plurality of paths configured to locate a plurality of segments of a composite material to form the part;
a course head manager configured to associate a plurality of associated paths from among the paths to a tool carriage pass, and assign each of the associated paths to one of a plurality of composite material application heads on the multihead composite material application machine.

32. The composite part program generator of claim 31, wherein the computer-aided design interface is further configured to convert the part definition from a computer-aided design format to a manufacturing tool surface definition and a plurality of ply definitions, wherein the part definition is received in the computer-aided design format.

33. The composite part program generator of claim 32, wherein the path generator is further configured to delimit a composite tape course definition based on the manufacturing tool surface definition, one of the ply definitions and one of the paths.

34. The composite part program generator of claim 31, wherein the course head manager is further configured to analyze each of the paths to determine if any of the paths requires a specialized composite material application head and assign any of the paths that requires the specialized composite material application head to a corresponding specialized composite material application head on the multihead composite material application machine.

35. The composite part program generator of claim 31, wherein the course head manager is further configured to perform machine-specific optimization to determine the most efficient associations and assignments of the paths.

36. The composite part program generator of claim 31, wherein the course head manager is further configured to resolve a composite material application head constellation configuration based on a ply orientation and a tool carriage direction of travel.

37. The composite part program generator of claim 36, further comprising a post-processor configured to define a constellation pathway based on the constellation configuration and the associated paths.

38. The composite part program generator of claim 37, wherein the post-processor is further configured to delineate a tool carriage route and a manufacturing tool route based the constellation pathway, wherein the tool carriage route and the manufacturing tool route are interdependent.

39. The composite part program generator of claim 37 wherein the post-processor is further configured to compute a plurality of machine axis position solutions to control at least one selected from the following: the tool carriage, the manufacturing tool and the composite material application heads; wherein the machine axis position solutions are based at least in part on one selected from the following: the tool carriage route, the manufacturing tool route, the constellation configuration, the paths, the association of the paths, and the assignment of the paths.

40. The composite part program generator of claim 39, wherein the post-processor is further configured to write a computer numerical control output data file based on the machine axis position solutions.

41. The composite part program generator of claim 35, wherein wherein the post-processor is further configured to write an output data file based on the machine axis position solutions, wherein the output data file is compatible with a simulator.

42. The composite part program generator of claim 31, further comprising a machine simulator configured to simulate the multihead composite material application machine, a machine controller, and a manufacturing tool to verify collision avoidance and to facilitate manual process refinement.

43. The composite part program generator of claim 31, wherein the multihead composite material application machine comprises a plurality of composite tape laying heads.

44. The composite part program generator of claim 31, wherein the multihead composite material application machine comprises a plurality of composite fiber placement heads.

45. The composite part program generator of claim 31, further comprising a post-processor configured to adjust a motion profile of one of the application heads in response to dynamically occurring data.

* * * * *

UNITED STATES PATENT AND TRADEMARK OFFICE
CERTIFICATE OF CORRECTION

PATENT NO. : 7,376,480 B2  Page 1 of 1
APPLICATION NO. : 11/269905
DATED : May 20, 2008
INVENTOR(S) : Allen B. Hagen et al.

It is certified that error appears in the above-identified patent and that said Letters Patent is hereby corrected as shown below:

Column 18, lines 16-19

Please delete the second occurrence of the following paragraph - "assigning any of the paths that requires the specialized composite material application head to a corresponding specialized composite material application head on the multihead composite material application machine."

Signed and Sealed this

Fifth Day of August, 2008

JON W. DUDAS
*Director of the United States Patent and Trademark Office*